Aug. 11, 1936. J. W. OGDEN ET AL Re. 20,064

MEANS FOR SETTING AND LOCKING THE PRINTING AND REGISTERING MECHANISMS OF POSTAGE METER MACHINES

Original Filed Jan. 20, 1931 2 Sheets-Sheet 1

Inventors
Jacob W. Ogden &
Berthold Kramer
By Alexander Lovell
Attorney

Aug. 11, 1936. J. W. OGDEN ET AL Re. 20,064

MEANS FOR SETTING AND LOCKING THE PRINTING AND REGISTERING MECHANISMS OF POSTAGE METER MACHINES

Original Filed Jan. 20, 1931 2 Sheets-Sheet 2

Inventor

Jacob W. Ogden &

Berthold Kramer

By Alexander Farrell

Attorney

Reissued Aug. 11, 1936 Re. 20,064

UNITED STATES PATENT OFFICE 20,064

MEANS FOR SETTING AND LOCKING THE PRINTING AND REGISTERING MECHANISMS OF POSTAGE METER MACHINES

Jacob W. Ogden, Springdale, and Berthold Knauer, East Norwalk, Conn., assignors to Pitney-Bowes Postage Meter Co., Stamford, Conn., a corporation of Delaware Original No. 1,904,626, dated April 18, 1933, Serial No. 510,026, January 20, 1931. Application for reissue April 15, 1935, Serial No. 16,500

31 Claims. (Cl. 101—91)

This invention is an improvement in so-called postage meter machines of that class in which the postage indicia is carried by a rotatable drum and at each operation of the machine the drum is rotated to print the postage indicia which is carried thereby. Such machines are commonly used for printing prepaid postage indicia on mail matter or on paper strips to be applied as stamps to mail matter. A machine of this general type is shown in companion application filed March 30, 1931, Serial No. 526,527, but our present invention is not limited to use in connection with this particular machine, and is capable of use in connection with various types of machines whether such have rotary or reciprocating printing means, and in which the postage or value printing indicia is carried by either a rotatable drum or a reciprocating member.

In machines of such class whereby various amounts of value indicia may be printed by varying or adjusting the printing wheels or dies, it is essential that the registering mechanism be operated in exact accordance with the value of the stamp voucher or ticket printed, and that the value of each imprint be accurately registered by the registering mechanism. Therefore it is very important to provide means whereby it will be impossible for any one to fraudulently operate the machine so as to obtain an impression of a stamp without having the amount thereof registered, or whereby any one by shifting the value printing devices during the operation thereof could obtain the impression of a stamp of higher denomination and only register a stamp of lower denomination, and such machines have generally been provided with some means whereby such fraudulent use of the machine was intended to be prevented.

One object of our invention is to provide a novel mechanism whereby the value printing devices mounted in or on a rotatable drum or in a reciprocating support can be positively adjusted by the key controlled setting-up means to print any desired amount (corresponding to the amount represented by the key depressed).

A further object is to provide means whereby any movement of the printing drum or of a reciprocator from its normal rest position, causes instantaneous and automatic locking of the value printing devices in the drum or reciprocator in their pre-adjusted position therein and also prevents operation of the connecting operative mechanisms between the said printing devices and the said setting-up devices, and insures correct registration of such pre-adjusted value amount.

In the accompanying drawings we have illustrated one embodiment of our invention in connection with a postal franking machine of the rotary printing drum type referred to: showing novel operative means by which the printing devices can be set-up for printing different values and such values registered by the meter, and the devices and setting-up means automatically locked against change or fraudulent manipulation until such value has been printed and registered.

We will first explain the embodiment of the invention shown in the drawings to enable others to understand and use the invention; and thereafter summarize in the claims the essentials of the invention, and the novel features of construction and novel combinations of parts for which protection is desired.

Figure 1:
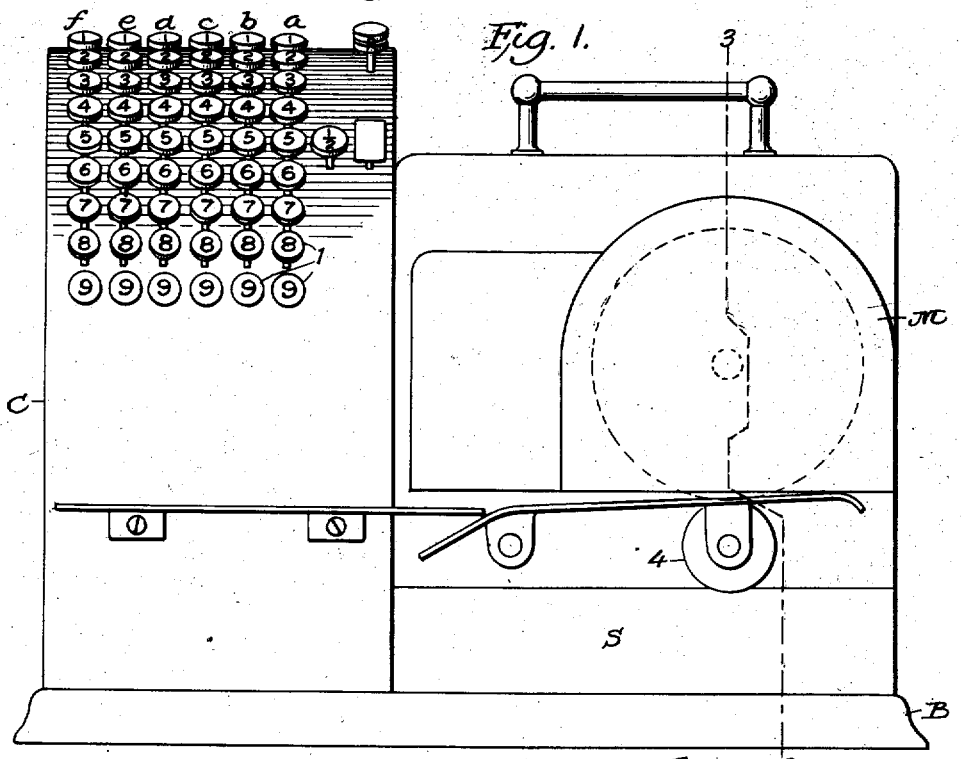
Fig. 1 is a front elevation of a machine showing the relative positions of the setting-up devices; the registering devices, and the rotary drum carrying the printing devices.
Figure 2:
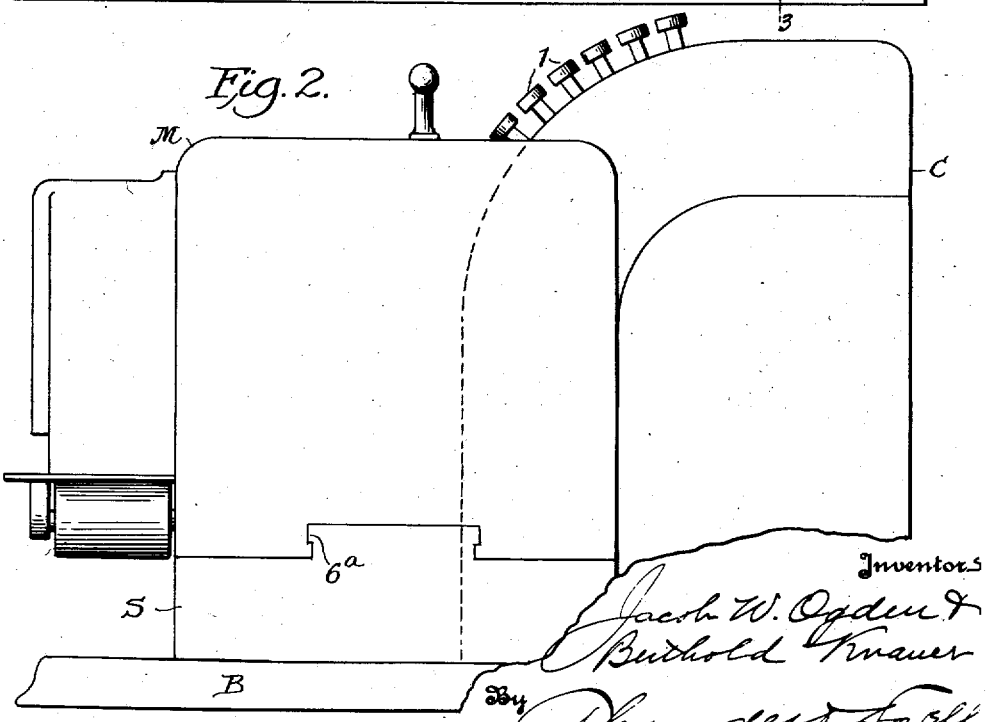
Fig. 2 is an end elevation of Fig. 1 viewed from the right.

Before describing the invention illustrated it should be noted that in machines arranged for printing indicia of monetary value for any purpose, as for instance postal indicia for franking mail, and wherein the value of each issued indicia is registered in a meter, it is generally desirable to be able to vary the value of the indicia printed so that any class of mail or package may be stamped for delivery at the post office, but each stamp value must be properly added to the total registered and also deducted from the amount of postage for which the user paid the postal authorities.

In order that envelopes of varying bulk and uneven surface may be passed through such a machine and also that thin adhesive strips may be printed to be attached to bulky parcels like ordinary postage stamps it is found desirable to employ a rotary printing drum rather than a reciprocating member to carry the several printing indicia (designating station, date, postage value, etc.). The value printing wheels in the drum must of necessity be adjustable in order to enable different amounts or values to be printed; but they may remain set in order to repeat the printing of the same amount for any desired number of successive operations. In our invention we provide novel means to control the adjustment of the printing wheels, etc. in the drum for printing different values, which can be operated by setting-up keys, or levers, such as are ordinarily employed in cash registers; and means whereby as the drum is moved from normal during an operation the value printing devices therein will be disengaged from the mechanisms which connect the value devices and the setting-up means when the drum is at its normal rest or starting position; and both the setting-up means, and the adjustable printing devices in the rotary drum will be securely locked against any possible alteration of their adjustment whenever the machine is stopped at any other than normal or starting position. In our invention the connecting mechanism can be effectively operated only when the machine is at normal starting position, and is rendered instantaneously ineffective when the drum moves out of normal starting position. When the connecting operating mechanism is ineffective the setting-up means will be locked against movement and, in their previously adjusted positions, will definitely control the meter register wheels during the cycle of operations of the drum.

The machine shown has a base B upon which is mounted a casing C in which is the main operating shaft 41 of the machine and the setting-up devices which are controllable by depressible keys or levers 1. The particular construction of these setting-up devices is not an essential feature of the present invention and therefore we have only illustrated such parts thereof in the drawings as is necessary to impart a clear understanding of the operation of our present invention.

Mounted upon the base B adjacent the casing C is a support S upon which is removably mounted a meter M, which may be of the general type shown and described in the application of Messrs. Wheeler and Ogden, filed March 8, 1929, Serial No. 345,515, or of other desired construction. This meter ordinarily contains a total register R and a subtracting register R′ which is operated by suitable gearing from a main shaft 11 in the meter, which shaft is driven (when the meter is in operative position in the machine) by a connection with the main shaft 41 of the machine in the casing.

Figure 3:
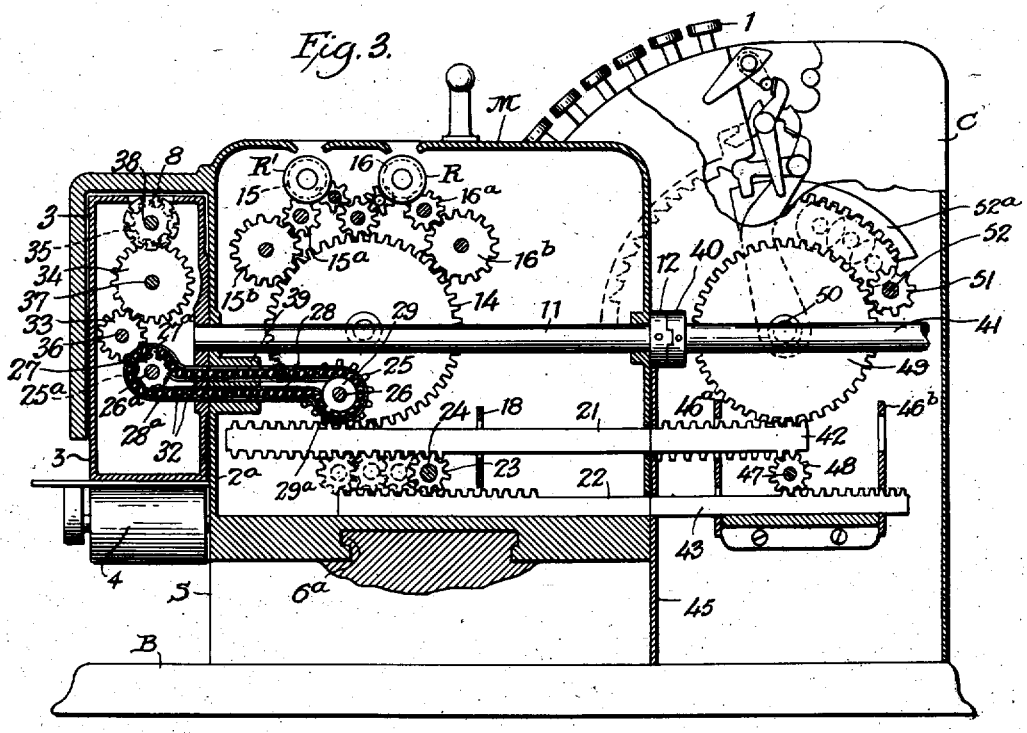
Fig. 3 is a sectional end elevation on lines 3—3 Fig. 1 viewed from the right, and showing the relative normal positions of the parts assumed when the machine has completed a series of operations, and the drum is at rest or starting position.

In the construction indicated in the drawings, see Fig. 3, the numeral wheels of the total register R are driven by a train of gears 16, 16*a* and 16*b* from a master gear 14. The subtracting register R′ is also driven by a train of gears 15, 15*a*, 15*b* from the gear 14. This gear 14 meshes with a rack bar 21 which is operated as hereinafter described so as to move the gear 14 a number of teeth corresponding to the number of the key depressed as hereinafter explained, and for each reciprocatory movement of the bar 21. For example the amount corresponding to the number of the key depressed will be subtracted on register R′ and added on register R. If the key 5 was depressed for each reciprocatory movement of rack 21 five would be subtracted on register R′ and five added on register R.

The meter M is made detachable so it can be taken to a postoffice, the amount of prepaid postage purchased can be set up on the register R′ and then the meter sealed by the official; when the charged meter is replaced in the machine the latter can be operated until the amount of postage paid for has been exhausted. Then the meter and machine are automatically locked so no further impression can be made until the meter has been reset. Such automatic locking mechanism forms no part of our present invention, therefore only so much of the mechanism of the meter as is necessary to an understanding of our present invention is illustrated herein.

In the present instance the meter main shaft 11 carries the printing drum 3, which may be of any suitable construction; it carries suitable indicia on its periphery and in this instance, the drum also carries a value printing die or wheel 8 at its periphery which can be adjusted by novel means, hereinafter explained, to vary the value numerals presented at the printing point. In addition the drum may also carry devices for printing designs, notations, etc., in addition to the value but such auxiliary printing devices form no part of the present invention and therefore are not illustrated herein.

In the machine to which our invention is shown as applied, the casing C contains a manually or power operated drive shaft 41 which carries one member 40 of a coupling the other member 12 of which is attached to the inner end of the main shaft 11 of the meter M. In the example shown the meter has a dove-tailed groove in its base engaging a dove-tailed rib 6*a* on the support S. When the meter is slid into operative position the tongue on member 12 engages a groove in the member 40, and then shafts 41 and 11 must and will rotate as one, and when shaft 41 is rotated the drum 3 will be turned.

Within the casing C is a shaft 50 which carries a gear 49 that meshes with a pinion 51 on a shaft 52 which is adapted to be engaged by a sector 52*a* that is operable a greater or less extent of movement by means controlled by the keys in the related row of keys or levers projecting through the casing C. There are usually nine keys in each row (see Fig. 1) and if key No. 1 in the row related to sector 52*a* is depressed (assume that is the row marked *a* in Fig. 1) it will through the mechanism operate pinion 51 sufficiently to move gear 49 one tooth. If the key marked 9 in the row *a* was depressed the sector 49 would be moved 9 teeth. In other words the sector is moved one or more teeth in accordance with the number and position of the key depressed. As stated the specific mechanism for operating gear 49 from a key is not claimed herein, and it is unnecessary to further describe the same as various mechanisms of this type are well known.

To facilitate an understanding of the construction and operation of our invention we will describe the machine as if there was but one row (*a*) of keys, one gear 49, one printing wheel 8, and only the set of connections shown between said gear 49 and wheel 8. To avoid confusion in the drawings the duplicate sets of devices controlled by the keys in other rows will be omitted.

The gear 49 (see Fig. 3) meshes with a slidable rack bar 42 guided in bearings 46*a* and 46*b* below the shaft 41. The bar 42 is toothed on both upper and lower sides and its lower rack meshes with a pinion 48 on shaft 47, and the lower side of pinion 48 meshes with a slidable rack bar 43 also guided in slots in guides 46*a*, 46*b* (as indicated in Fig. 3). The guides for the rack bars may be of any suitable construction and are only conventionally illustrated. In the normal position of the drum 3 (at the end of one operation and ready for another) the bars 42, 43 are in the positions shown in Fig. 3 with their front ends flush with the outer surface of the front wall 45 of the casing (C as indicated in Fig. 3) and in this position the bars will not interfere with the removal or replacement of the meter M.

Within the meter casing M are upper and lower rack bars 21 and 22 which respectively mesh with the upper and lower sides of a pinion 23 mounted on a shaft 24, said bars being guided in slots in guides 18 within the meter casing.

When the meter is in proper position in the machine and the shafts 11 and 41 in axial alinement and clutched together as in Fig. 3, the rear ends of bars 21 and 22 are flush with the outer face of the rear wall of the meter; and bar 21 is in alinement and contacts with bar 42, and bar 22 is in alinement and contacts with rack 43. Consequently if gear 49 is turned bar 21 will be moved by and with bar 42, and bar 22 will be moved by and with bar 43.

Bar 21 has a double rack, and the upper rack meshes with gear 14 and with a gear 25 on a shaft 26 in the meter casing. On shaft 26 is fixed a disk 29 which has one peripheral tooth **29*a* which moves within the bend of a U-shaped raceway 28, the parallel runs of such raceway extending parallel with the shaft 11 from the bend around disk 29 to the front wall 2*a* of the meter casing and close to the rear wall of the drum 3**.

Figure 7:
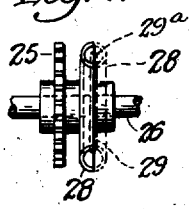
Figure 6:
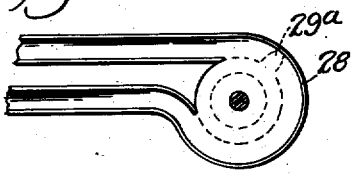

This raceway may be formed in any convenient manner; preferably we form it of two similar complemental members 28 (see Fig. 7) one of said complemental members being shown in Fig. 6. These members when pressed together form a hollow raceway in which are placed movable objects such as balls 32 which can travel through the raceway and fill it, but at the bend the tooth **29*a* of the disk 29 projects into this raceway and fills and occupies the space of one ball and consequently if the rack 21 is moved thereby rotating gear 25 and disk 29 then the tooth 29*a* would force the balls to move in the raceway to an extent equal to the length of arcuate movement of the tooth. For convenience in construction, the complemental members 28 (Figs. 6 and 7) could have their ends inserted in suitable bores in the lug 39 so that they will be held thereby but the outer ends of the legs of the complemental member terminate flush with the outside surface of the wall 2*a* adjacent the housing of the drum 3**.

Within the drum is a continuation of the raceway, formed by complemental members **28*a* the ends of which may be fastened in bores in the inner wall of hub of the drum; and the bend of the members 28*a* encircle a disk 27 on a shaft 26*a*, mounted in the drum at right angles to the axis of the drum and within the bend of the members 28*a* of the raceway. The disk 27 has a tooth 27*a* (similar to the tooth 29*a* of disk 29) that projects into the bend of the raceway within the drum and occupies the space of one ball, and consequently when the raceway is filled and the parts are in the position shown in Fig. 3, the balls are moved in the raceway by the movement of disk 27 and all the balls in the raceway would be similarly displaced, and the balls engaging the tooth 27*a* of disk 27 would cause said disk to rotate exactly the same arcuate extent that disk 29 is rotated. Movement of the balls in the raceway however is only possible when the parts are in starting position (Fig. 3) and the ends of parts 28*a* of the raceway register with the ends of part 28 of the raceway. As soon as the drum starts to rotate the ends of portions 28 and 28*a* of the raceway will be moved out of alinement, and the balls in each part of the raceway become locked therein and cannot escape. The balls in the portion 28 will be retained therein by the outer face of the rear wall of the drum which is closely fitted against the outer face of the outer wall 2*a* of the meter; and the balls in the part 2*a* of the raceway will be retained therein by the outer face of the wall 2*a* of the meter (see Fig. 4); thus the balls in both sections of the raceway are absolutely locked therein and cannot be moved therein until the drum is again stopped at normal starting position and the legs of the parts 28 and 28*a*** of the raceway are again in exact axial alinement, as in Fig. 3.

The drum may be provided with the usual printing indicia, and as it is to print different values or numbers it is provided with printing wheels or dies 8 bearing different numeral values on the periphery; and ordinarily a plurality of such wheels are provided, mounted on a common axis. These printing wheels 8 are rotatably mounted on a shaft 38 within the drum 3 (see Figs. 3 and 4) the axis of the shaft being perpendicular to the axis of the drum. Each wheel 8 has a pinion 35 meshing with the gear 34 on a shaft 37 in the drum which gear 34 meshes with a pinion 33 on a shaft 36 and the pinion 33 meshes with the pinion **25*a* on a shaft 26*a* within the drum; the rotation of said shaft 26 being operatively controlled by the series of balls or movable members 32, which are movable in an endless closed circuit only when the drum is in the non-printing position as indicated in Fig. 3, and when at this position and at rest the balls can be operated by the depression of the keys 1** and in accordance with the number of the key depressed as hereinbefore explained.

*Operation*

Figure 4:
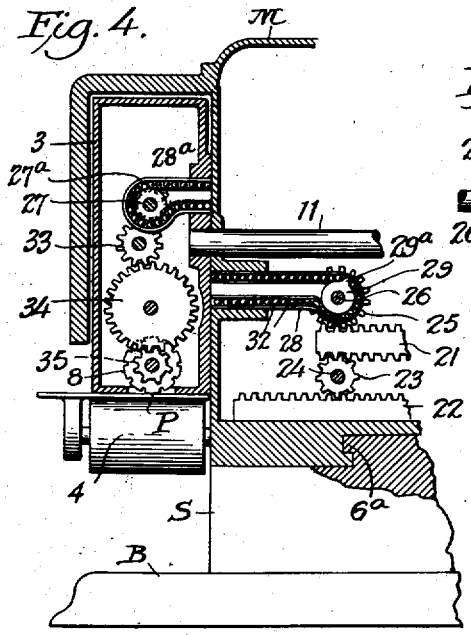
Fig. 4 is a fragmentary sectional view similar to Fig. 3 showing the printing drum turned so that the value printing wheels are at printing position.
Figure 5:
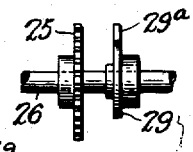
Figs. 5, 6 and 7 are details.

Assuming that the parts have operated and arrived at the position of rest Fig. 3 and it is desired to change the printing wheels 8 to present some other type or figure at the printing point indicated at P Fig. 4. At the next operation of the machine if the operator depressed the key #5 in row *a* this key will through the proper connections operate gear 51 and cause it to turn gear 49 five teeth and therefore move bar 42 five teeth to the right, and rack 42 through pinion 48 will cause bar 43 to move five teeth to the left. The movement of bar 43 moves rack 22 five teeth to the left and bar 22 through pinion 23 moves bar 21 five teeth to the right, and bar 21 turns both gear 25 and gear 14 five teeth anticlockwise. As disk 29 moves with gear 25 its tooth **29*a* causes the balls 32 to move a distance of five teeth throughout the raceway 28, 28*a*, and the balls in so doing turn disk 27 the distance of five teeth, similarly rotating gear 25*a* fast to disk 27. Gear 25*a* through pinions 33, 34 and 35 turns the numeral disk 8 five teeth bringing the printing numeral "5" to position at the periphery of the drum. Then the drum is turned by operating shaft 41 and the instant the drum moves rotatorially from the position shown in Fig. 3 the portion 28*a* of the ball raceway moves out of alinement with the portion 28 and the balls become locked in both sections of the raceway (see Fig. 4). The balls in the portion 28 of the raceway then effectively lock the bars 21, 22 and through them bars 42 and 43 and gear 49, so that they cannot be again moved until the drum has made a complete revolution and the portions of the raceway are restored to the positions shown in Fig. 3. The balls in the part 28a of the raceway also lock disk 27 and gear 29 (see Fig. 4) and the numeral wheel 8 cannot rotate or shift its position in the drum until the parts are restored to the normal or rest position (indicated in Fig. 3). When the drum has made a one-half revolution the numeral 5 on the disk 8 is brought to printing position, as indicated at P in Fig. 4, and can cooperate with the impression roll 4**, or other impression means, to take an impression from the numeral wheel.

From the foregoing it will be seen that the printing wheel can only be adjusted when the parts are in normal rest position, as in Fig. 3; and that the instant the drum moves out of this position, and so long as it remains out of this position, the printing wheel is locked against further shifting; and also that the bars 21, 22, 42 and 43 and gear 49, etc., are locked so that they cannot be again adjusted until the drum has again returned to normal rest position, Fig. 3. Thus the balls in the raceway not only serve to transmit motion from the key to the printing wheel in the drum, when the drum is at rest position; but also serve as a means for locking the numeral wheel in the drum, the registers in the meter, and the key setting-up devices in the casing, when the drum is out of normal rest position.

As above stated in the complete machine a plurality of printing wheels will ordinarily be provided in the drum and a corresponding plurality of setting-up and adjusting devices provided for such wheels as above described. These would be duplicates and therefore need not be described. In the machine indicated there are six rows of numeral wheels consequently there would be six rows of setting keys in the casing; six numeral wheels, like 8, in the drum, and there will be controlling devices, such as above described, between each row of keys and its related numeral wheel whereby such wheel may be adjusted according to the key depressed when the parts are in normal rest position, and the parts locked as described when the drum is moved out of normal position.

The invention however is not limited to the use of a raceway of the particular form set forth in the foregoing description.

A plurality of setting devices are indicated by means of dotted lines in Fig. 3 but only one set is shown in full lines to avoid confusion and obscuration of the drawings.

While we have shown and preferably employ balls as the movable objects in the raceway, obviously other objects capable of operating in a closed circuit and performing the described functions may be used.

We claim:—

1. In a machine of the character specified; a rotary drum containing value printing means, a rotatable member and connections in the drum for shifting the value printing means; a rotatable member exterior to the drum, key-controlled means for variably shifting the latter member; a raceway including both said rotary members; and means in the raceway whereby movement of one rotary member may be transmitted to the other when the drum is in normal rest position; the continuity of the raceway being broken when the drum moves out of normal position, thereby locking both the said members, and such continuity being automatically restored when the drum is returned to normal position thereby unlocking said members.

2. In combination with mechanism as set forth in claim 1, key controlled setting-up devices, and means controlled by said setting-up devices whereby when the drum is in normal rest position the said rotary member exterior to the drum may be shifted in accordance with the value of the key depressed and the value printing devices in the drum correspondingly shifted.

3. In a machine of the character specified having a meter; a rotary drum; value printing means therein, a rotatable member in the drum connected with said value printing means, a rotatable member exterior to the drum, a raceway comprising a section in the drum and a section in the meter, said sections respectively including one of the said rotary members; and means in the raceway whereby movement of the rotary member in the meter is transmitted to the member in the drum; the section of the raceway being disconnected by movement of the drum out of normal rest position and preventing shifting of said members until the drum is returned to rest position.

4. In combination with mechanism as set forth in claim 3, key controlled setting-up devices exterior to the meter and means controlled by said setting-up devices whereby when the drum is in normal rest position the said rotary member in the meter may be shifted in accordance with the value of the key depressed and the value printing devices in the drum correspondingly shifted.

5. In a machine of the character specified, a meter casing, a rotary printing drum exterior to the meter casing; variable value printing devices in the drum, means in the drum for adjusting said devices; key controlled setting-up devices, adjustable means in the meter operable by said setting-up devices; an endless raceway having a section in the drum and a section in the meter casing and means in said raceway whereby the said means in the drum may be operated by the adjustable means in the meter when the drum is in normal rest position; and whereby both said adjusting means will be locked when the sections of the raceway are relatively displaced by movement of the drum from normal position.

6. In a machine of the character specified having a meter; a rotary printing drum exterior to the meter; variable value printing devices in the drum; a rotary member and gearing in the drum for shifting the value printing devices; a similar rotary member in the meter; an endless raceway having a section in the drum connecting with the rotary member in the drum; and a section in the meter connecting with the rotary member in the meter; and means in said raceway whereby the member in the drum may be shifted by and in accordance with the movement of the rotary member in the meter only when the drum is at normal rest position; and whereby both members will be locked when the sections of the raceway are relatively displaced by movement of the drum from normal position.

7. In combination with mechanism as set forth in claim 6 key controlled setting-up devices exterior to the meter, and means in the meter controlled by said setting-up devices whereby when the drum is in normal rest position the said rotary member in the drum may be shifted in accordance with the value of the key depressed, and the value printing devices in the drum correspondingly shifted.

8. In a machine of the character specified; a rotary printing drum, said drum containing variable value printing devices, a toothed rotary disk and gearing operated by said disk for shifting said value printing devices; a similar rotary toothed disk exterior to the drum; an endless raceway comprising a section in the drum enclosing the rotary disk in the drum, a series of movable objects in said raceway whereby the disk in the drum can be shifted by the exterior disk, said disks being shiftable only when the drum is at normal rest position, and both disks being locked when the sections of the raceway are relatively displaced by movement of the drum from normal position.

9. In combination with mechanism as set forth in claim 8, key controlled setting-up devices exterior to the drum and racks and gearing controlled by said setting-up devices whereby the said exterior rotary disk may be shifted in accordance with the value of the key depressed when the drum is in normal rest position and the value printing devices in the drum correspondingly shifted.

10. In a machine of the character specified, a rotary support carrying value printing means and a rotatable member for shifting said means; a similar rotatable member exterior to the drum; a raceway having a section in the drum and a section exterior thereto, said sections respectively including one of the said rotary members; and means in the raceway whereby movement of the exterior rotary member is transmitted to the member in the drum.

11. In a machine of the character specified; a drum carrying variable value printing devices; a raceway having a section in the drum and a section exterior thereto; an adjustable member in the raceway exterior to the drum, means in said raceway whereby the variable value printing devices in the drum may be shifted by and in accordance with the movement of the said adjustable member; and devices whereby the means in said raceway can be shifted only when the drum is at normal rest position.

12. In a machine of the character specified; a rotary drum carrying variable value printing devices; key controlled setting-up devices; adjustable means exterior to the drum and operable by said setting-up devices; a raceway having a section in the drum and a section exterior thereto; and movable means in said raceway whereby when the drum is in normal rest position the value printing devices in the drum may be operated by the said adjustable means.

13. In a machine of the character specified; a rotary support carrying value printing means and a rotary member for shifting said means; a similar rotary member adjacent the support, and a raceway including both of the said rotary members; means for shifting the rotary member adjacent the support, means in the raceway whereby movement of the rotary member is transmitted to the member in the drum; and means whereby the printing means is shifted by and in accordance with the shifting of the members in the raceway.

14. In a machine of the character specified; a drum carrying variable value printing devices, a raceway having a section in the drum and a section exterior thereto, an adjustable member in the exterior section of the raceway, means in said raceway whereby the variable value printing devices in the drum may be shifted by and in accordance with the movement of the said adjustable member and devices whereby the means in said raceway can be shifted only when the drum is at normal rest position.

15. In a machine of the character specified; a rotary drum carrying variable value printing devices; key controlled setting-up devices, adjustable means exterior to the drum operable by said setting-up devices; a raceway having a section in the drum and a section exterior thereto enclosing said adjustable means, and movable means in said raceway whereby when the drum is normal rest position the said value printing devices in the drum may be operated by the said adjustable means.

16. In a machine of the character specified, a rotary drum, printing means in said drum and means for shifting said printing means; devices for setting said shifting means, and a connection between said devices and said shifting means, including a channel having sections aligned when the drum is in normal rest position, and disconnected when the drum is out of such position, and means in the channel for transmitting movement of said devices, to said printing means.

17. In a machine of the character specified having a rotary printing drum and variable printing means in said drum, a controlling device for setting said variable printing means, and a connection between said controlling device and said variable printing means including a channel or channels having sections aligned when the drum is in normal rest position and disconnected when the drum is out of said position, and means in the channel or channels for transmitting the movement of said controlling device to said variable printing means.

18. In a machine of the character specified, a rotary support carrying printing means and means for variably shifting said printing means; controlling devices for setting said means, and a connection between said devices and said means including a channel having a section in the rotary support and a section exterior thereto, and means in the channel whereby movement of the devices is transmitted to the said means.

19. In a machine of the character specified having a movable printing member carrying variable printing means, a controlling device for setting said variable printing means, and a connection between said controlling device and said variable printing means including a channel having a section in a movable printing member and a section exterior thereto, said sections aligning when the printing member is in one position, and means in the channel whereby movement of the controlling device is transmitted to the variable printing means.

20. In a machine of the character specified, a rotary drum, value printing means, and means for shifting said value printing means in said drum; key controlled devices for setting said shifting means, and a connection between said devices and said means including a channel having sections aligned when the drum is in normal rest position and disconnected when the drum is out of such position, and movable objects in the channel whereby movement of the devices can be transmitted to the said value shifting means, said transmission of movement being possible only when the drum is in normal rest position, and said objects locking the value printing means in adjusted position when the drum is out of normal position.

21. In a machine of the character specified having a movable printing member carrying variable printing means; a controlling device for setting said variable printing means, and a connection between said controlling device and said variable printing means including a channnel having a section in a movable printing member and a section exterior thereto, said sections aligning when the printing member is in one position, and means in the channel whereby movement of the controlling device is transmitted to the variable printing means, said means in the channel consisting of objects movable when the printing member is in one position and locking the variable printing means when the printing member is in other positions.

22. In a printing mechanism embodying a stationary member supporting a rotatable printing drum carrying variable printing devices; and a controlling connection between said printing devices and the stationary member of the mechanism, including a channel in said drum aligning with a channel in the stationary member in one position in the orbit of the printing drum and a series of movable objects in said channel.

23. In a printing mechanism embodying a stationary member supporting a movable printing member carrying variable printing devices; a controlling connection between said printing member and the stationary member of the mechanism, including a channel in said printing member aligning with a channel in said stationary member in one position of the movement of the printing member, and a series of movable objects in said channel.

24. In a machine of the character specified; a rotary drum containing value printing means; connections in the drum for shifting the value printing means; a fixed support for said drum; key-controlled means mounted in said support; a raceway between said key-controlled means and said connections; and means in the raceway whereby movement may be transmitted to said connections when the drum is in normal rest position; the continuity of the raceway being broken when the drum moves out of normal position, thereby locking said connections and said key-controlled means, and such continuity being automatically restored when the drum is returned to normal position thereby unlocking said connections and said key-controlled means.

25. In a machine of the character specified; an impression member containing value printing means; connections in said impression member for variably adjusting said value printing means; a support for said impression member; key-controlled setting-up devices mounted in said support; a raceway between said setting-up devices and said connections; and means in the raceway whereby movement may be transmitted to said connections when said impression member and said support are both normally at rest position, the continuity of the raceway being broken when either the said impression member or the said support are individually moved from the normal rest position thereby locking both the said key-controlled setting-up devices and said connections, and such continuity being automatically restored when both the said impression member and said support are at normal rest position.

26. In a machine of the character specified, a movable member carrying variable printing means, means for shifting said printing means; devices for setting said shifting means, and a connection between said devices and said shifting means including a channel having sections aligned when the member is in normal rest position but disconnected when the member is out of such position and means in the channel for transmitting movement of said devices to said printing means.

27. In a machine of the character specified, a movable member carrying variable printing means and means for shifting said printing means; devices exterior to said member for setting said shifting means, and a connection between said devices and said shifting means including a channel having sections aligned when the member is in normal rest position but disconnected when the member is out of such position and means in the channel for transmitting movement of said devices to said printing means.

28. In a machine of the character specified, a movable member carrying variable printing means and means for shifting said printing means; devices exterior to said members for setting said shifting means, and connection between said devices and said shifting means including a channel having sections aligned when the movable member is in normal rest position, but disconnected when the movable member is out of such position, and a series of movable objects in the channel for transmitting movement of said devices to said printing means.

29. In a machine of the character specified, a rotary printing member having omni-denominational printing means associated therewith, manually operable setting means, connecting members normally positioned in operative driving relation between said printing means and setting means when the rotary printing member is in a normal rest position, the connection between said connecting members being adapted to be automatically broken and said connecting members being placed in a non-driving position when the rotary printing member is moved out of its normal rest position, and means engaged by separate sections of the connection members when their connection is broken to independently lock both the setting means and printing means in their set positions.

30. In a machine of the character specified, a rotary printing member having omni-denominational printing means associated therewith, manually operable setting means, connecting members including means arranged in an unbroken contiguous loop and positioned in operative relation between said printing means and setting means when the rotary printing member is in a normal rest position, and means whereby said loop is broken and the connecting members are adapted to be automatically placed in an inoperative and locked position with relation to said printing means and setting members when the rotary printing member is moved out of its normal rest position.

31. In a machine of the character specified, a rotary printing drum having omni-denomination value printing means contained therein, controlling means positioned exteriorly of the drum, connecting members between said printing means and controlling means, means whereby one section of the connecting member is displaced from operative relation with another section upon movement of the printing drum, and means engaged by each section of said connecting members when displaced to thereby lock the printing means and controlling means until the printing drum returns to its starting position.

JACOB W. OGDEN.
BERTHOLD KNAUER.